Dec. 2, 1969  H. ETTISCHER ET AL  3,481,260
PHOTOGRAPHIC CAMERA

Filed Oct. 21, 1966  2 Sheets-Sheet 1

HELMUT ETTISCHER
KURT STEISSLINGER
INVENTORS

BY Malcolm M. Dunn
Robert W. Hampton
ATTORNEYS

United States Patent Office 3,481,260
Patented Dec. 2, 1969

3,481,260
PHOTOGRAPHIC CAMERA
Helmut Ettischer and Kurt Steisslinger, Stuttgart-Wangen, Germany, assignors to Eastman Kodak Company, Rochester, N.Y., a corporation of New Jersey
Filed Oct. 21, 1966, Ser. No. 588,555
Claims priority, application Germany, Nov. 13, 1965, K 57,653
Int. Cl. G03b *19/04, 1/06*
U.S. Cl. 95—31                                   6 Claims

ABSTRACT OF THE DISCLOSURE

A roll film camera having an auxiliary film winding mechanism to impart rotation to the take-up spool as the camera cover is being closed. The cover door of the camera is provided with an auxiliary film winding mechanism operatively interconnecting the cover door and the take-up spool for rotating the take-up spool to wind the film thereon when the cover door is closed.

---

The present invention relates to photographic cameras of the type employing roll film and more particularly to means for facilitating the loading of such cameras.

To load most roll film cameras, a film supply spool or cassette is installed in the camera in an appropriate supporting structure at one side of a film guide surface adapted to support the film in the focal plane of the camera objective. The leading end of the filmstrip is then attached to a rotatable film take-up spool or spindle on the other side of the film guide surface, with the adjacent end portion of the filmstrip traversing the film guide surface. When the cover door of the camera is closed, a pressure plate thereon urges the adjacent area of the film against the film support surface to establish a flat film exposure area. However, before the cover door is completely closed, it is important that the film be properly aligned with the support surface and free of excessive slack which might result in buckling or misalignment of the film between the support surface and the pressure plate. Also, in cassette loaded cameras, typical of which are most 35 millimeter cameras, the cassette must be radially oriented with its mouth aligned with the support surface. This orientation prevents interference with the cover door and insures that the film may be withdrawn freely from the cassette.

These criteria have heretofore required the camera operator manually to wind a short length of film onto the take-up spool to absorb unnecessary slack and, in the case of cassette-loaded cameras, manually to orient the cassette to position its mouth in proper relation to the film support surface. Such operations, which require both visual observation and manual manipulation, are inconvenient, require a fair degree of dexterity, and, if ignored or improperly executed, may result in malfunctioning or in damaging the camera or film.

It is an object of the present invention to simplify the loading of roll film cameras by incorporating in the camera an auxiliary film winding device for rotating a film take-up spool to wind film thereon when the camera cover door is closed.

It is another object of the present invention to provide a camera which is adapted to receive a film cassette with means for properly orienting the cassette when the camera cover door is closed.

Figure 1:
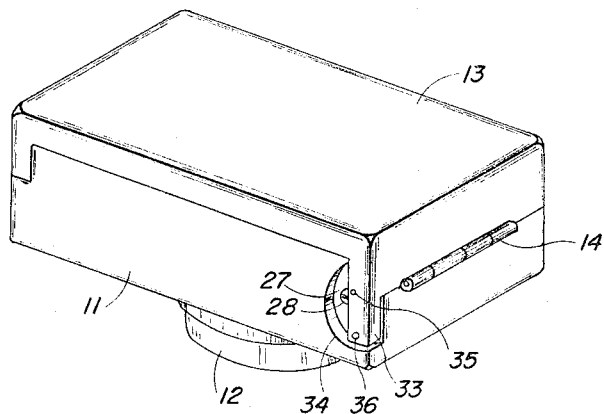
Figure 2:
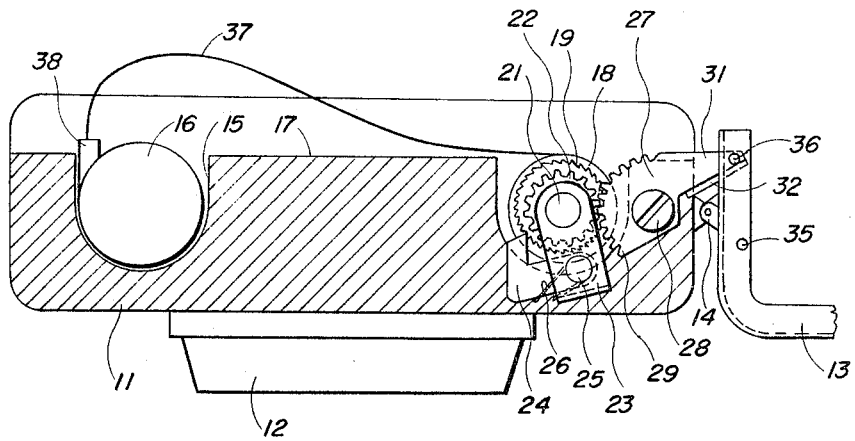
Figure 3:
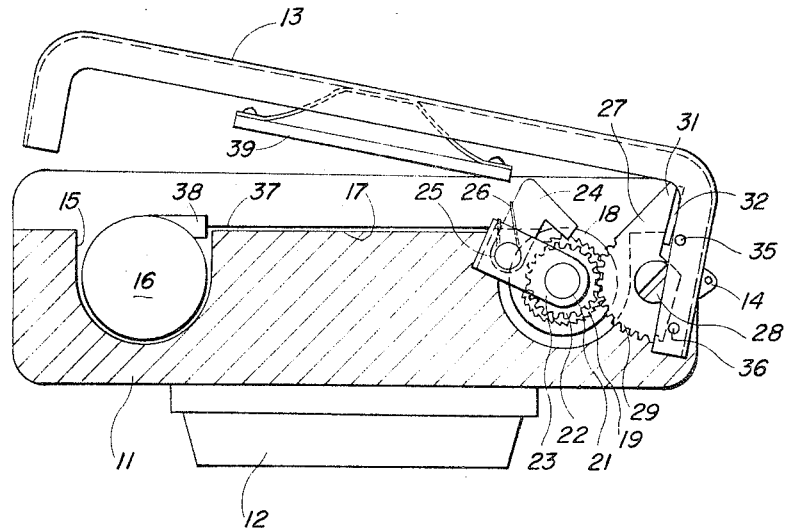

It is still another object of the present invention to provide such automatic film and cassette positioning means which are simple, dependable and relatively inexpensive, and which in no way interfere with the subsequent operation of the camera. These and other objects of the invention will be readily apparent from the following description of an illustrative embodiment, reference being made to the accompanying drawings in which:

FIGURE 1 is a perspective illustration of a camera according to a preferred embodiment of the invention, showing the camera cover door in closed position;

FIGURE 2 is a longitudinal view, partly in cross section, of the camera shown in FIGURE 1, illustrating schematically the essential elements of the invention in the positions assumed after the camera has been loaded but before the cover door has been closed; and FIGURE 3 is a view corresponding to FIGURE 2, showing the positions of the various illustrated elements of the invention as the cover door approaches its closed position.

Referring to FIGURE 1, the subject camera comprises a body member 11 supporting an objective or lens assembly 12 and provided with a cover door 13 attached to the body member by a hinge 14. As shown in FIGURES 2 and 3, the body member defines a film supply chamber 15 adapted to receive a film cassette 16 or, alternatively, a spool of roll film, to support the cassette or spool adjacent the film support surface 17 at the focal plane of the camera lens. Other means, such as spring members adapted to rotatably support the ends of the film supply spool or cassette, could likewise be employed for supporting the film supply element.

The film take-up spool, which may be removable in some cameras and which may or may not be provided with flanges, is shown at 18 adjacent surface 17, and is provided with means of the type well known in the camera art for attaching the end of the filmstrip thereto, preferably without requiring rotation of the take-up spool. After the camera has been loaded and closed, the take-up spool is rotated in a clockwise direction, as viewed in FIGURES 2 and 3 by a conventional film winding mehcanism, not shown, to wind film thereon.

The auxiliary film winding mechanism, comprising the present invention, includes a ratchet wheel 19 affixed to shaft 21, which is coaxial with and in rotative driving engagement with the take-up spool. A gear 22 is also supported by shaft 21 for free rotation thereon, and is attached to a pawl support arm 23. Pawl member 24 is pivotally attached to arm 23 by rivet 25 and is urged into light resilient contact with ratchet wheel 19 by a spring 26, to provide a unidirectional clutch between gear 22 and the take-up spool. Thus, when gear 22 is rotated in a clockwise direction as viewed in FIGS. 2 and 3, the film take-up spool is rotated in the same direction to wind film thereon, whereas counterclockwise rotation of gear 22 does not impart rotational movement to the take-up spool.

A coupling member 27, pivotally mounted to the camera body member by a screw 28, comprises a sector gear segment 29, in meshing engagement with gear 22, and a nose portion 31, including a lip 32. The corner of camera cover door 13, adjacent the coupling member, is provided with an extension, illustrated at 33. As shown in FIGURE 1, this extension of the cover door is accommodated by a recess 34 in the camera body to allow free movement of the door between its open and closed positions. The recess need not be visible when the camera is closed, as illustrated, but may be hidden by an appropriate flange on the cover door.

A pair of inwardly projecting pins 35 and 36 are provided respectively on the door cover 13 and its extension 33 adjacent the nose portion of the coupling member. As the door is moved from a substantially closed position as shown in FIGURE 3 to its open position shown in FIGURE 2, pin 36 engages the inner edge of lip 32 and moves coupling member 27, gear 22, pawl support arm 23 and pawl 24 to their respective positions shown in FIGURE 2. As previously explained, however, such movement does not rotate the take-up spool by virtue of the unidirectional driving relation between the pawl member and the ratchet wheel.

With the camera so opened, a film cassette 16 (or a spool of conventional roll film) is placed in the film supply chamber and the free end of the filmstrip 37 extending therefrom is attached to the take-up spool. As depicted in FIGURE 2, this operation may produce a considerable length of slack film adjacent the film support surface 17 and, if a film cassette is employed, may leave the cassette improperly oriented with its mouth portion 38 out of alignment with the film guide surface, whereby the film cannot freely be withdrawn from the cassette and proper closing of the cover door may be prevented.

As shown in FIGURE 3, as the cover door is closed, pin 35 engages the outer edge of lip 32 on coupling member 27 and rotates that member in a counterclockwise direction, thereby rotating gear 22 in a clockwise direction through an angle greater than that traversed by member 27 due to the difference in radii between gear 22 and gear segment 29. Such clockwise rotation of gear 22, as previously described, likewise rotates film take-up spool 18 in the same direction. Accordingly, unless an extraordinary amount of slack film is initially present a sufficient portion of the filmstrip is wound onto the take-up spool, as the cover door is being closed, to absorb the slack in the film and to draw the film substantially taut across the film support surface. This initial film winding operation also serves, if a film cassette is employed, to rotate the cassette into its proper position in which its mouth 38 is aligned properly with the film support surface, whereby the film is withdrawn tangentially from the cassette and across the film support surface. Thus, the final closing movement of the camera door brings the film pressure plate 39 into contact with an already substantially flat area of the filmstrip, thereby avoiding the possibility of buckling or folding the film between the pressure plate and the film support surface.

By virtue of the unidirectional clutch means provided by the cooperation of pawl 24 and ratchet wheel 19, the subsequent clockwise rotation of the take-up spool by the main film winding mechanism, as the loaded camera is operated, is in no way impaired by the auxiliary winding device. If the camera is of the type in which the film is rewound onto the supply spool or into the cassette after exposure, the rewinding mechanism of the camera can be provided with appropriate means, not shown, for withdrawing pawl 24 from engagement with ratchet wheel 19 during the rewinding operation, to permit counterclockwise rotation of the take-up spool as the film is unwound therefrom.

The invention has been described in detail with particular reference to preferred embodiments thereof, but it will be understood that variations and modifications can be effected within the spirit and scope of the invention as described hereinabove and as defined in the appended claims.

We claim:
1. In a photographic camera for exposing film having a leading end, said camera including:
 (a) a housing,
 (b) an objective in the housing and defining a focal plane,
 (c) means defining a film supply region in the housing for containing a supply of film,
 (d) a film take-up spool rotatably carried in the housing,
 (e) a film support surface between the means defining a supply region and the take-up spool for supporting film at the focal plane defined by the objective,
 (f) means for securing the leading end of the film to the film take-up spool,
 (g) primary winding means for rotating the take-up spool to wind film from said means defining a supply region onto the take-up spool, thereby advancing said film across the support surface, and
 (h) a cover door carried by the housing and movable between an open position wherein the camera interior is accessible for loading and removing film therefrom, and a closed position;
the improvement comprising:
 (i) auxiliary winding means operatively interconnecting the cover door and the take-up spool for rotating the take-up spool to wind film thereon when the cover door is moved from its open position to its closed position to thereby facilitate loading of the camera.

2. The improvement according to claim 1 wherein the means defining the film supply region is adapted to receive and support a roll of photographic film housed in a film cassette having a tangential mouth portion, and wherein said auxiliary winding means will orient the cassette to a position in which the mouth portion is in alignment with the film support surface by tensioning the film across the support surface and between the mouth portion of said cassette and the take-up spool when the cover door is moved from its open position to its closed position.

3. The improvement according to claim 1 further comprising means for rendering said auxiliary winding means inoperative when the primary winding means is used to rotate the film take-up spool for winding film thereon.

4. The improvement according to claim 3 in which said means for rendering said auxiliary winding means inoperative includes a unidirectional clutch adapted to impart rotational movement to the take-up spool by movement of the cover door only during movement of the door from its open position to its closed position, said take-up spool being rotatable by said primary winding means to wind film thereon independently of said auxiliary winding means.

5. The improvement according to claim 4 in which said auxiliary winding means includes:
 (a) a rotatable gear operatively connected to the take-up spool through said unidirectional clutch, and
 (b) a movable coupling member operatively associated with the cover door and provided with a gear segment in meshing engagement with said rotatable gear.

6. The improvement according to claim 5 in which said auxiliary winding means further comprises at least one pin on said movable cover door engageable with a surface of said coupling member in the path of movement of said pin to define the operative association between said coupling member and said cover door.

References Cited
UNITED STATES PATENTS

| | | | |
|---|---|---|---|
| 1,251,654 | 1/1918 | Greene | 95—32 |
| 2,033,703 | 3/1936 | Greene | 95—32 |
| 2,169,548 | 8/1939 | Zapp | 95—31 |
| 2,186,633 | 1/1940 | Drotning | 95—31 |

NORTON ANSHER, Primary Examiner

JOSEPH F. PETERS, Jr., Assistant Examiner

U.S. Cl. X.R.
242—71.4